(12) United States Patent
Park et al.

(10) Patent No.: US 10,104,620 B2
(45) Date of Patent: Oct. 16, 2018

(54) METHOD AND DEVICE FOR OPERATION BASED ON POWER SAVE MODE IN WLAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 15/315,332

(22) PCT Filed: Feb. 6, 2015

(86) PCT No.: PCT/KR2015/001217
§ 371 (c)(1),
(2) Date: Nov. 30, 2016

(87) PCT Pub. No.: WO2015/186889
PCT Pub. Date: Dec. 10, 2015

(65) Prior Publication Data
US 2017/0188306 A1 Jun. 29, 2017

Related U.S. Application Data

(60) Provisional application No. 62/006,269, filed on Jun. 2, 2014.

(51) Int. Cl.
*H04W 52/02* (2009.01)
*H04L 5/00* (2006.01)
*H04W 84/12* (2009.01)

(52) U.S. Cl.
CPC ....... *H04W 52/0245* (2013.01); *H04L 5/0055* (2013.01); *H04W 84/12* (2013.01)

(58) Field of Classification Search
CPC ............. H04W 52/02; H04W 52/0216; H04W 52/0245; H04W 84/12; H04L 5/0055
See application file for complete search history.

(56) References Cited

U.S. PATENT DOCUMENTS

| 2014/0029600 A1* | 1/2014 | Kim | H04W 74/08 370/338 |
| 2014/0112266 A1* | 4/2014 | Seok | H04W 74/04 370/329 |

(Continued)

FOREIGN PATENT DOCUMENTS

| KR | 1020130139761 A | 12/2013 |
| KR | 1020140023851 A | 2/2014 |

(Continued)

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.9., pp. 473-474 (3 pages provided).

(Continued)

*Primary Examiner* — Pao Sinkantarakorn
*Assistant Examiner* — Kabir Jahangir
(74) *Attorney, Agent, or Firm* — Lee Hong Degerman Kang Waimey

(57) ABSTRACT

Disclosed are a method and a device for operation based on a power save mode in a WLAN. The method for operation based on a power save mode in a WLAN may comprise steps in which: an STA receives an ACK frame from an AP in response to a PS-poll frame; after receiving the ACK frame, the STA receives a different BSS PPDU before receiving a downlink frame from the AP; and the STA determines (Continued)

whether or not to switch to a doze state from an awake state on the basis of the reception strength of the different BSS PPDU.

8 Claims, 12 Drawing Sheets

(56) References Cited

U.S. PATENT DOCUMENTS

| | | | |
|---|---|---|---|
| 2015/0173012 A1 | 6/2015 | Seok | |
| 2015/0230170 A1 | 8/2015 | Jeong et al. | |
| 2015/0245292 A1 | 8/2015 | Jeong et al. | |
| 2015/0341880 A1* | 11/2015 | Seok | H04W 52/0216 370/350 |

FOREIGN PATENT DOCUMENTS

| | | | | |
|---|---|---|---|---|
| KR | 1020140056181 A | 5/2014 | | |
| WO | WO 2013119095 A1 * | 8/2013 | | H04W 52/0216 |
| WO | 2014069869 A1 | 5/2014 | | |

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.10., pp. 474-477(5 pages provided)

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™A/D12, Nov. 2011, section 8.3.3.11., pp. 478-479 (3 pages provided).

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.5.-8.3.3.6., pp. 467-468 (3 pages provided).

PCT International Application No. PCT/KR2015/001217, International Search Report dated May 11, 2015, 2 pages.

* cited by examiner

FIG. 1
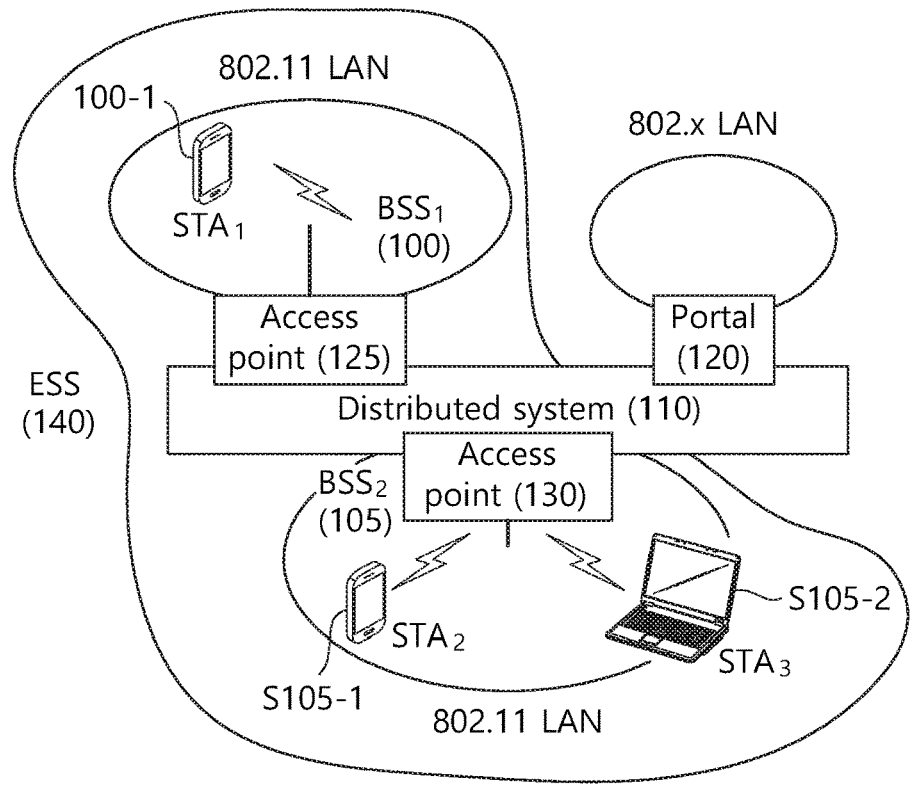
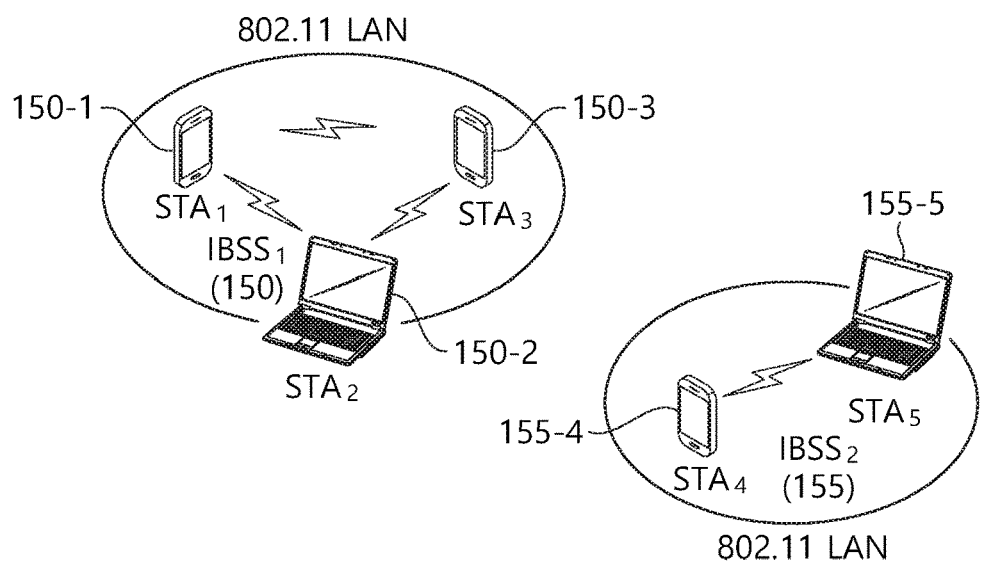

METHOD AND DEVICE FOR OPERATION BASED ON POWER SAVE MODE IN WLAN

CROSS-REFERENCE TO RELATED APPLICATIONS

This application is the National Stage filing under 35 U.S.C. 371 of International Application No. PCT/KR2015/001217, filed on Feb. 6, 2015, which claims the benefit of U.S. Provisional Application No. 62/006,269, filed on Jun. 2, 2014, the contents of which are all hereby incorporated by reference herein in their entirety.

BACKGROUND OF THE INVENTION

Field of the Invention

The present invention relates to wireless communication and, more particularly, to a method and apparatus operating based on a power save mode in a wireless local area network (WLAN).

Related Art

An IEEE 802.11 standard provides a power save mechanism (or power save mode) to increase the lifespan of a wireless local area network (WLAN) station (STA). The STA operating based on the power save mode may operate in an awake state or a doze state for power saving. The awake state is a state which enables a normal operation of the STA such as frame transmission or reception, channel scanning, etc. On the other hand, the doze state is a state in which power consumption is extremely reduced and thus frame transmission or reception and channel scanning are impossible. In a case where the STA usually operates in the power save mode, the STA is in the doze state and, when necessary, transitions to the awake state, thereby reducing power consumption.

If the STA operates for a long time in the doze state, power consumption of the STA is reduced. Therefore, the lifespan of the STA may be increased. However, frame transmission or reception is impossible in the doze state. Therefore, the STA cannot stay for a long time in the doze state. If a pending frame is generated in the doze state, the STA may transition to the awake state to transmit the frame to an access point (AP). However, if the STA is in the doze state and a pending frame to be transmitted to the STA exists in the AP, the STA cannot receive the pending frame from the AP, and cannot know that the pending frame exists in the AP. Therefore, the STA may acquire information regarding the presence/absence of the pending frame in the AP, and may operate by periodically transitioning to the awake mode in order to receive the pending frame in the AP.

The AP may acquire information regarding awake mode operating timing of the STA, and may transmit the information regarding the presence of the pending frame in the AP according to the awake mode operating timing of the STA.

More specifically, in order to receive information regarding the presence/absence of a frame to be received from the AP, the STA may periodically transition from the doze state to the awake state to receive a beacon frame. The AP may report the presence/absence of a frame to be transmitted to each STA on the basis of a traffic indication map (TIM) included in the beacon frame. The TIM is used to report the presence of a unicast frame to be transmitted to the STA, and a delivery traffic indication map (DTIM) may be used to report the presence of a multicast frame/broadcast frame to be transmitted to the STA.

SUMMARY OF THE INVENTION

An object of the present invention is to provide a method operating based on a power save mode in a wireless local area network (WLAN).

Another object of the present invention is to provide an apparatus operating based on a power save mode in a WLAN.

An operating method based on a power save mode in a WLAN according to an aspect of the present invention for achieving the object of the present invention includes the steps of switching, by a station (STA), to an awake state based on listen duration and receiving a beacon frame from an access point (AP), the beacon frame including traffic indication map (TIM) information indicative of downlink data buffered with respect to the STA, sending, by the STA, a power saving (PS)-poll frame for the reception of a downlink frame including the buffered downlink data to the AP, receiving, by the STA, an acknowledgement (ACK) frame from the AP as a response to the PS-poll frame, receiving, by the STA, another basic service set physical layer protocol data unit (BSS PPDU) before receiving the downlink frame from the AP after receiving the ACK frame, and determining, by the STA, whether or not to switch from the awake state to a doze state based on reception intensity of the another BSS PPDU. The another BSS PPDU may include a frame transmitted by another BSS other than a BSS including the STA.

An STA operating based on a power save mode in a WLAN according to another aspect of the present invention for achieving the object of the present invention includes a radio frequency (RF) unit implemented to transmit or receive a radio signal and a processor operatively connected to the RF unit. The processor may be implemented to switch to an awake state based on listen duration and receive a beacon frame including traffic indication map (TIM) information indicative of downlink data buffered with respect to the STA from an access point (AP), send a power saving (PS)-poll frame for the reception of a downlink frame including the buffered downlink data to the AP, receive an acknowledgement (ACK) frame from the AP as a response to the PS-poll frame, receive another basic service set physical layer protocol data unit (BSS PPDU) before receiving the downlink frame from the AP after receiving the ACK frame, and determine to switch from the awake state to a doze state based on the reception intensity of the another BSS PPDU. The another BSS PPDU may include a frame transmitted by another BSS other than a BSS including the STA.

An STA operating in traffic indication map (TIM)-based power save mode can switch to a doze state based on the transmission intensity of a frame transmitted by another BSS. Accordingly, power of an STA can be reduced and the operation time of an STA operating based on a battery can be increased.

BRIEF DESCRIPTION OF THE DRAWINGS

FIG. 1 is a conceptual diagram showing the configuration of a wireless local area network (WLAN).

DESCRIPTION OF EXEMPLARY EMBODIMENTS

Figure 2:
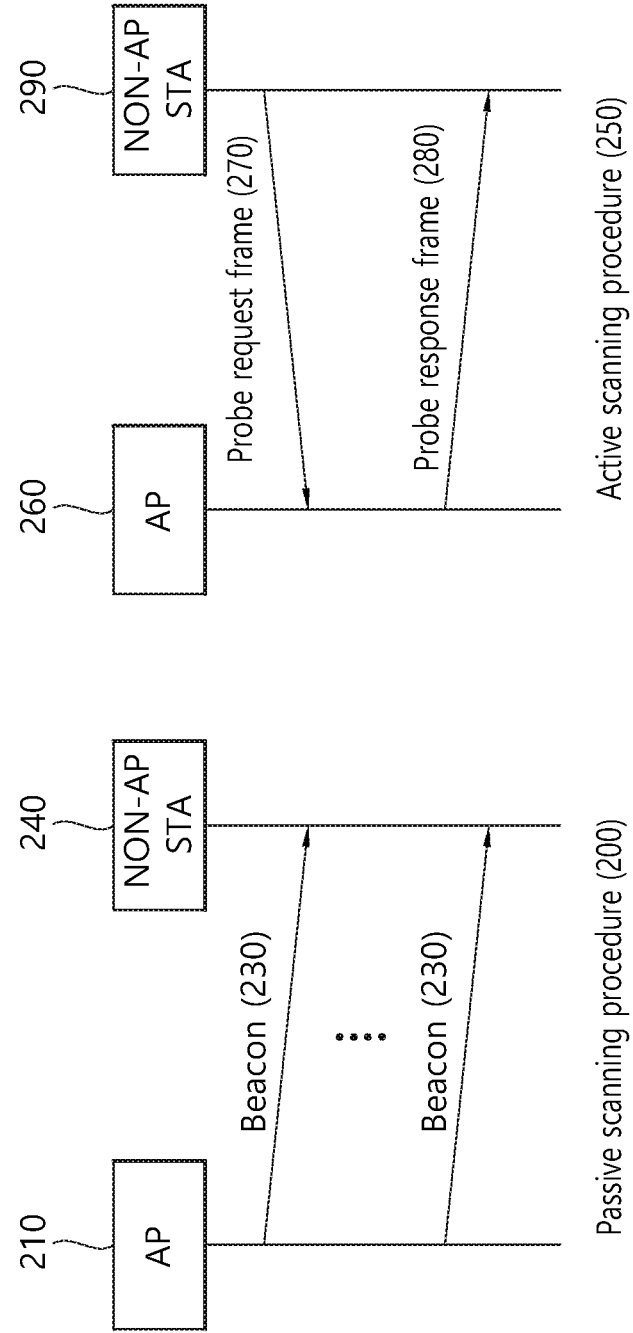
FIG. 2 is a conceptual diagram showing a scanning method in a WLAN.

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Hereinafter, in an embodiment of the present invention, data (or a frame) to be transmitted from the AP to the STA may be expressed by the term 'downlink data (or a downlink frame)', and data (or a frame) to be transmitted from the STA to the AP may be expressed by the term 'uplink data (or an uplink frame)'. In addition, transmission from the AP to the STA may be expressed by the term 'downlink transmission', and transmission from the STA to the AP may be expressed by the term 'uplink transmission'.

FIG. 2 is a conceptual diagram showing a scanning method in a WLAN.

Referring to FIG. 2, the scanning method may be divided into passive scanning 200 and active scanning 250.

Referring to the left side of FIG. 2, passive scanning 200 may be performed by a beacon frame 230, which is periodically broadcasted by an AP 210. The AP 210 of the wireless LAN broadcasts a beacon frame 230 to a non-AP STA 240 at each specific interval (e.g., 100 msec). Information on the current network may be included in the beacon frame 230. By receiving the beacon frame 230 that is periodically broadcasted, the non-AP STA 240 receives the network information and may perform scanning on the AP 240, which will be performing the authentication/association procedure, and the channel.

The passive scanning method 200 may be performed by simply receiving the beacon frame 230 that is being transmitted from the AP 210 without requiring the non-AP STA 240 to transmit any frames. Therefore, the passive scanning 200 is advantageous in that the overall overhead, which occurs due to the transmission/reception of data within the network, is small. However, since the scanning process can only be performed manually in proportion to the cycle of the beacon frame 230, passive scanning 200 is disadvantageous in that the time consumed for performing the scanning process is relatively longer in comparison with the active scanning method. Detailed description on the beacon frame is disclosed in 8.3.3.2 beacon frame of the IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)', which was disclosed in November 2011. In IEEE 802.11 ai, a beacon frame of another format may be additionally used, and such beacon frame may be referred to as a fast initial link setup (FILS) beacon frame. Additionally, a measurement pilot frame may be used in the scanning procedure as a frame including only a portion of the information of the beacon frame. The measurement pilot frame is disclosed in the IEEE 802.11 8.5.8.3 measurement pilot format.

Additionally, a FILS discovery frame may also be defined. As a frame being transmitted from each AP in-between the transmission cycle periods of the beacon frame, the FILS discovery frame may correspond to a frame that is transmitted while having a cycle period that is shorter than the beacon frame. More specifically, the FILS discovery frame corresponds to a frame that is being transmitted while having a transmission cycle period that is shorter than the beacon frame. The FILS discovery frame may include identifier information (SSID, BSSID) of the AP transmitting the discovery frame. The FILS discovery frame may be transmitted before the beacon frame is transmitted to the STA, so as to allow the STA to discover in advance that an AP exists within the corresponding channel. An interval at which the FILS discovery frame is transmitted is referred to as a FILS discovery frame transmission interval. The FILS discovery frame may be transmitted while including a portion of the information included in the beacon frame.

Referring to the right side of FIG. 2, in active scanning 250, a non-AP STA 290 may transmit a probe request frame 270 to an AP 260, thereby being capable of actively performing a scanning procedure.

After receiving the probe request frame 270 from the non-AP STA 290, the AP 260 waits for a random period of time in order to prevent frame collision. And, then, the AP 260 may include network information to a probe response frame 280 and may transmit the probe response frame 280 to the non-AP STA 290. The non-AP STA 290 may obtain the network information based on the received probe response frame 280 and may then stop the scanning procedure.

In case of active scanning 250, since the non-AP STA 290 actively performs scanning, it is advantageous in that the time consumed for performing the scanning procedure is short. However, since the non-AP STA 290 is required to transmit the probe request frame 270, it is disadvantageous in that the network overhead increases for the transmission and reception of the frames. The probe request frame 270 is disclosed in IEEE 802.11 8.3.3.9, and the probe response frame 280 is disclosed in IEEE 802.11 8.3.3.10.

Once the scanning is completed, the AP and the non-AP STA may perform the authentication and association procedures.

Figure 3:
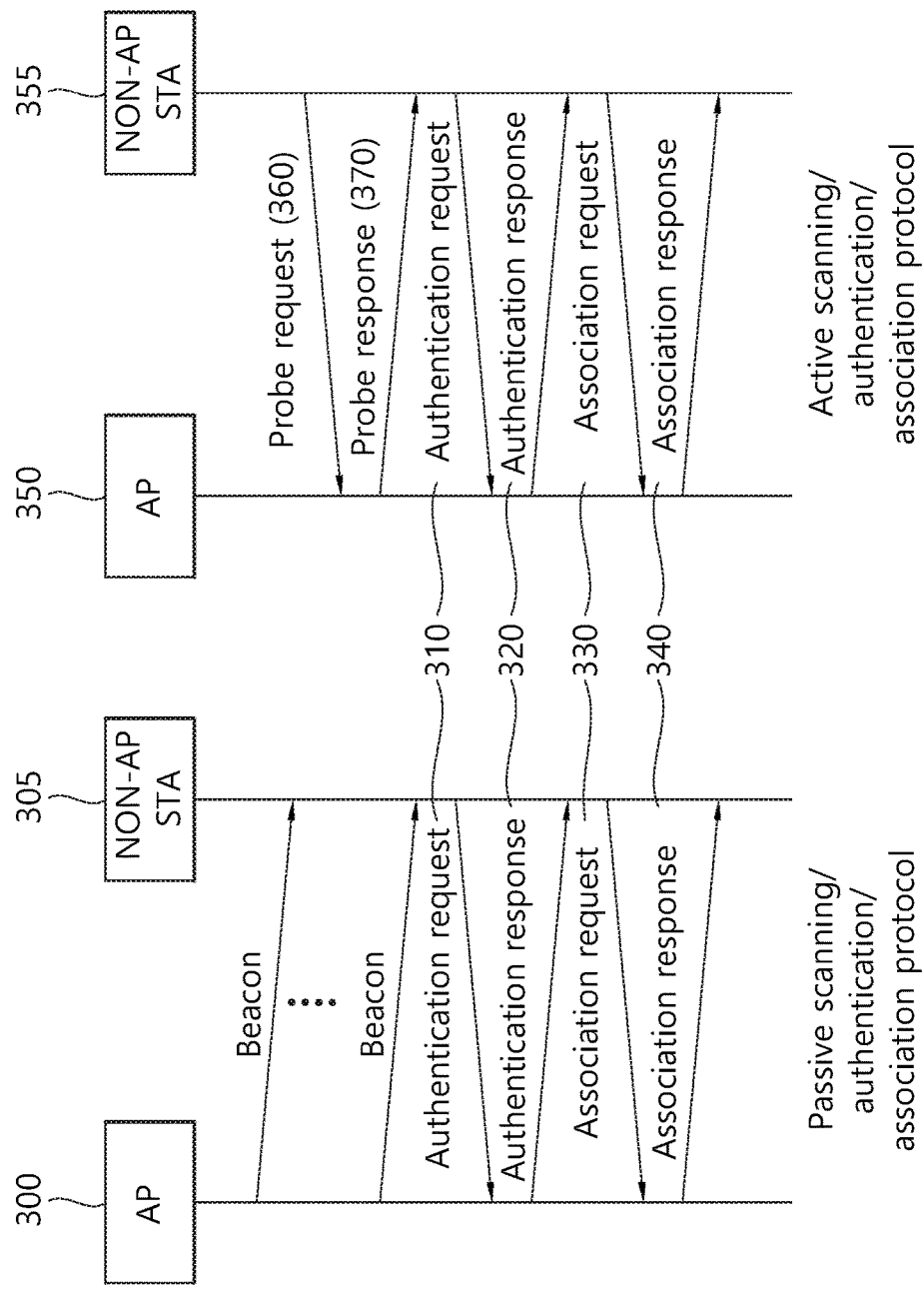
FIG. 3 is a conceptual diagram showing an authentication procedure and association procedure performed after the scanning procedure of an AP and an STA.

FIG. 3 is a conceptual view showing an authentication Procedure and an authentication procedure that are performed after a scanning procedure of an AP and a STA.

Referring to FIG. 3, after performing the passive/active scanning procedure, the authentication procedure and the association procedure may be performed with one of the scanned APs.

The authentication and association procedures may be performed, for example, through 2-way handshaking. The left side of FIG. 3 is a conceptual view showing the authentication and association procedures after performing passive scanning, and the right side of FIG. 3 is a conceptual view showing the authentication and association procedures after performing scanning.

Regardless of whether the active scanning method or the passive scanning method has been used, the authentication procedure and the association procedure may be equally performed by exchanging an authentication request frame 310/authentication response frame 320 and an association request frame 330/association response frame 340 between the AP 300 and 350 and the non-AP STA 305 and 355.

During the authentication procedure, the non-AP STA 305 and 355 may transmit an authentication request frame 310 to the AP 300 and 350. As a response to the authentication request frame 310, the AP 300 and 350 may transmit an authentication response frame 320 to the non-AP STA 305 and 355. Detailed description on the authentication frame format is disclosed in IEEE 802.11 8.3.3.11.

During the association procedure, the non-AP STA 305 and 355 may transmit an association request frame 330 to the AP 300 and 350. And, as a response to the association request frame 330, the AP 300 and 350 may transmit an association response frame 340 to the non-AP STA 305 and 355. Information related to the ability of the non-AP STA 305 and 355 is included in the association request frame 330, which is transmitted to the AP. Based on the capability information of the non-AP STA 305 and 355, the AP 300 and 350 may determine whether or not the non-AP STA 305 and 355 can be supported. In case the non-AP STA 305 and 355 can be supported, the AP 300 and 350 may transmit the association response frame 340 to the non-AP STA 305 and 355. The association response frame 340 may include information on whether or not the association request frame 330 is accepted and the corresponding reason and capability information of the non-AP STA that can be supported by the corresponding AP. Detailed description on the association frame format is disclosed in IEEE 802.11 8.3.3.5/8.3.3.6.

After the association procedure is carried out between the AP and the non-AP STA, normal transmission and reception of data may be performed between the AP and the non-AP STA. In case the association procedure between the AP and the non-AP STA has failed, based on the reason why the association procedure has failed, the association procedure may be performed once again with the same AP, or a new association procedure may be performed with another AP.

In case the STA is associated with the AP, the STA may be allocated with an association ID (association identifier, AID) from the AP. The AID that is allocated to the STA may correspond to a unique value within one BSS, and the current AID value may correspond to any one of the values within the range of 1~2007. Since 14 bits are allocated for the AID, although a maximum of 16383 bits may be used for the AID value, values within the range of 2008~16383 are reserved.

In the IEEE 802.11 standard, in order to extend the life span of STAs of a wireless LAN, a power save mechanism (Power save Mode) is provided.

An STA, which operates based on the Power Save mode, may reduce its power consumption by operating while shifting to and from an awake state and a doze state, thereby extending the operation life span of the STA. An STA, which operates based on an Active mode, may maintain the awake state. Based on information on a transmission opportunity (TXOP), although the Active mode may include a TXOP Power Save mode, which shifts the STA to and from the awake state and the doze state, it will be assumed that the STA is maintained in the awake state for simplicity.

An STA being in the awake state may perform normal operations, such as transmission or reception of frames, channel scanning, and so on. Conversely, an STA being in the doze state does not perform any transmission or reception of frames and does not perform any channel scanning in order to reduce power consumption. An STA operating in the Power Save mode maintains the doze state in order to reduce power consumption, and, then, when required, the corresponding STA may perform a shift (or transition) to the awake modes so as to carry out communication with the AP.

As the duration time for maintaining the doze state of the STA becomes more extended, the power consumption of the STA may be required, and the life span of the STA may be extended. However, in the doze state, it is impossible for the STA to perform the transmission or reception of frames. if a pending uplink frame exists in the STA, the STA, which was operating in the Power Save mode, may shift from a doze state to an active state, or, if a pending uplink frame exists in the STA, the STA, which was operating in the Power Save mode, may shift from a Power Save mode to an Active mode, thereby being capable of transmitting an uplink frame to the AP. Conversely, in case a pending frame that is to be transmitted to the STA, which is being operated in the doze state, exists in the AP, the AP cannot transmit the pending frame to the STA before the shift of the STA to the Awake mode.

Therefore, the STA operating in the Power Save mode may occasionally shift from the doze state to the awake state and may receive information on whether or not any pending frame for the STA exists from the AP. Considering a shifting time of the STA operating in the Power Save mode to the awake state, the AP may transmit information on the presence of pending downlink data for the STA to the STA.

More specifically, in order to receive information on the presence or absence of a pending frame for the STA, the STA operating in the Power Save mode periodically shifts from the doze state to the awake state, thereby being capable of receiving the beacon frame. As a frame being used for the passive scanning of the STA, the beacon frame may include information on the capability of the AP. The AP may periodically (e.g., 100 msec) transmit a beacon frame to the STA.

Figure 4:
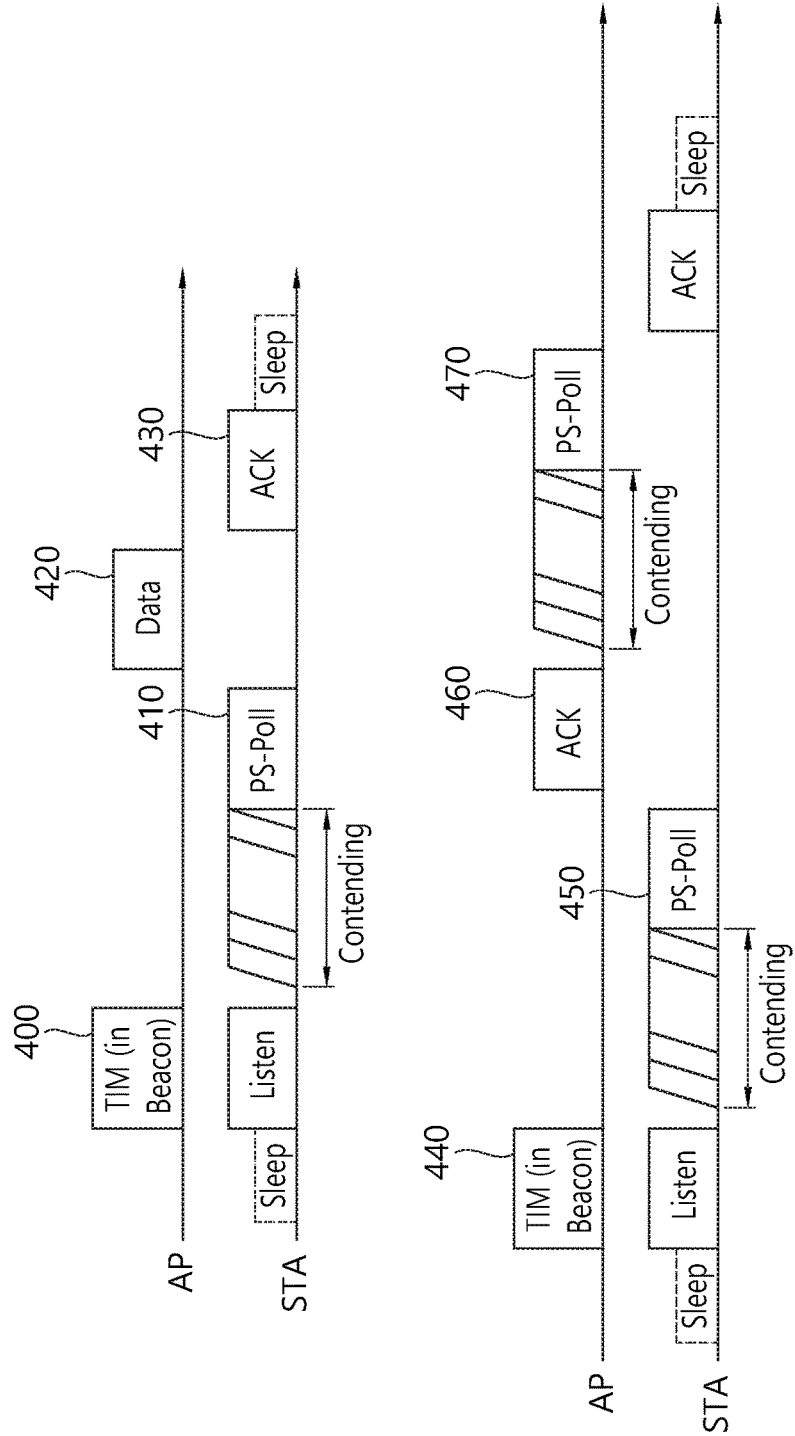
FIG. 4 is a conceptual diagram showing a power save method based on a beacon frame.

FIG. 4 is a conceptual view showing a beacon frame based power saving method.

Referring to FIG. 4, the AP may periodically transmit a beacon frame, and, while considering the transmission timing of the beacon frame, the STA operating in the Power Save mode may periodically shift from the doze state to the awake state, thereby being capable of receiving the beacon frame. The beacon frame based Power Saving method may also be expressed by using the term TIM-based power save mode.

The beacon frame may include a traffic indication map (TIM) element. The TIM element may be used for transmitting the information on the pending downlink data for the STA to the AP. For example, the TIM element may include information on the pending downlink data for the STA based on a bitmap. The TIM element may be identified as a TIM or DTIM (delivery TIM). The TIM may indicate the presence of pending downlink data that are to be transmitted to the STA based on unicast. The DTIM may indicate the presence of pending downlink data that are to be transmitted based on broadcast/multicast.

The upper portion of FIG. 4 discloses a method of an AP for transmitting a downlink frame based on an immediate response to a power save (PS)-poll frame.

Referring to the upper portion of the FIG. 4, the STA may receive information on the presence of pending downlink data for the STA from the AP based on the TIM of the beacon frame 400. The STA may transmit a PS-poll frame 410 to the AP. The AP may receive the PS-poll frame 410 from the STA and may then transmit a downlink frame 420 to the STA as an immediate response to the received PS-poll frame 410. The immediate response to the PS-poll frame of the AP may be performed after a short interframe space (SIFS) after receiving the PS-poll frame.

The STA may transmit an ACK frame 430 as a response to the downlink frame. In case the transmission of the pending downlink data for the STA is ended, the STA operating in the Power Save mode may perform shifting (or transition) back to the doze state.

The lower portion of FIG. 4 discloses a method of an AP for transmitting a downlink frame based on a deferred response to a PS-poll frame.

Referring to the lower portion of the FIG. 4, the STA may receive information on the presence of pending downlink data for the STA from the AP based on the TIM of the beacon frame 440. The STA may transmit a PS-poll frame 450 to the AP. The AP may receive the PS-poll frame 450 from the STA and may then transmit an ACK frame 460 to the STA as a response to the received PS-poll frame 450. After the transmission of the ACK frame 460, the AP may transmit a downlink frame 470 including the pending downlink data to the STA. After receiving the ACK frame 460, the STA may monitor the downlink frame 470 being transmitted by the AP to the STA.

Similarly, in case the transmission of the pending downlink data for the STA is ended, the STA operating in the Power Save mode may perform shifting (or transition) from the awake state back to the doze state.

Figure 5:
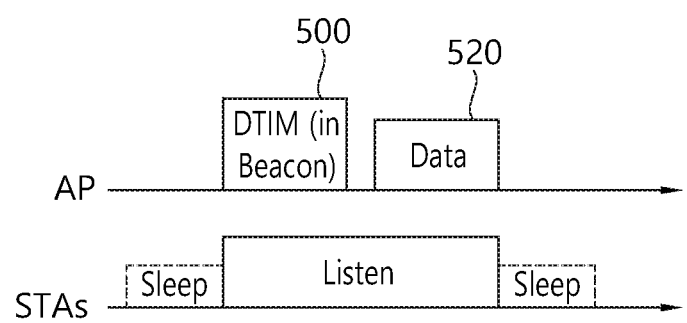
FIG. 5 is a conceptual diagram showing a power save method based on a beacon frame.

FIG. 5 is a conceptual view showing a beacon frame based power saving method.

FIG. 5 discloses a case when a DTIM is delivered through a beacon frame 500. The beacon frame 500 may include a DTIM. As described above, the DTIM may indicate the presence of pending downlink data that are to be transmitted based on broadcast/multicast.

Referring to FIG. 5, the AP may transmit a beacon frame 500 including a DTIM to the STA. After receiving the beacon frame 500 including the DTIM, the STA may maintain the awake state without transmitting the PS-poll frame and may monitor the transmission of the downlink frame 520. The AP may transmit the downlink frame 520 to the STA by using the multicast method or the broadcast method.

Hereinafter, in the exemplary embodiment of the present invention, the transmission from the AP to the STA may also be expressed by using the term downlink transmission. Each of the PPDU, frame, and data being transmitted via downlink transmission may be respectively expressed by using the terms downlink PPDU, downlink frame, and downlink data. The PPDU may correspond to a data unit including a PPDU header, and a physical layer service data unit (PSDU) (or MAC protocol data unit (MPDU)). The PPDU header may include a PHY header and a PHY preamble, and the PSDU (or MPDU) may include a frame or may indicate a frame. The PHY header may also be expressed differently by using the term physical layer convergence protocol (PLCP) header, and the PHY preamble may also be expressed differently by using the term PLCP preamble.

Additionally, the transmission from the STA to the AP may also be expressed by using the term uplink transmission. Each of the PPDU, frame, and data being transmitted via uplink transmission may be respectively expressed by using the terms uplink PPDU, uplink frame, and uplink data.

In a WLAN system, an STA may operate based on a TXOP power save mode, that is, a TXOP-based power save mode, in addition to a TIM-based power save mode.

The power management mode of an STA may be divided into an active mode and a power save mode. The TIM-based power save mode is one of the power save modes.

The TXOP power save mode is one of the active modes. In general, an STA operating in the active mode continues to maintain the awake state, whereas an STA operating in the TXOP power save mode may switch to the doze state for TXOP duration in which another STA sends a frame if a medium through which another STA sends the frame is occupied.

If an STA operates in the TXOP power save mode, the STA may receive a downlink frame from an associated AP, and may determine whether it will switch to the doze state or maintain the awake state based on a group ID and a partial association identifier (PAID) included in the PHY header (or PLCP header) of a downlink PPDU on which the downlink frame has been carried.

For example, the STA may switch to the doze state if a group ID included in the PHY header of the received downlink PPDU is not identical with the group ID of the STA. Furthermore, the STA may switch to the doze state if a group ID included in the PHY header of the received downlink PPDU is identical with the group ID of the STA, but a PAID included in the PHY header of the downlink PPDU is not identical with the PAID of the STA.

In an existing WLAN system, an STA operating in the TXOP power save mode switches from the awake state to the doze state only if a received frame is a frame transmitted by an AP (or a BSS including the STA) associated with the STA.

In the embodiment of the present invention, if an STA operates in the TIM-based power save mode, when the STA receives a frame (or PPDU) transmitted by another BSS (or an AP or STA included in another BSS), a power save mode that supports the STA so that it switches to the doze state is initiated. Such a power save mode may be expressed as a term called another BSS TXOP power save mode.

Figure 6:
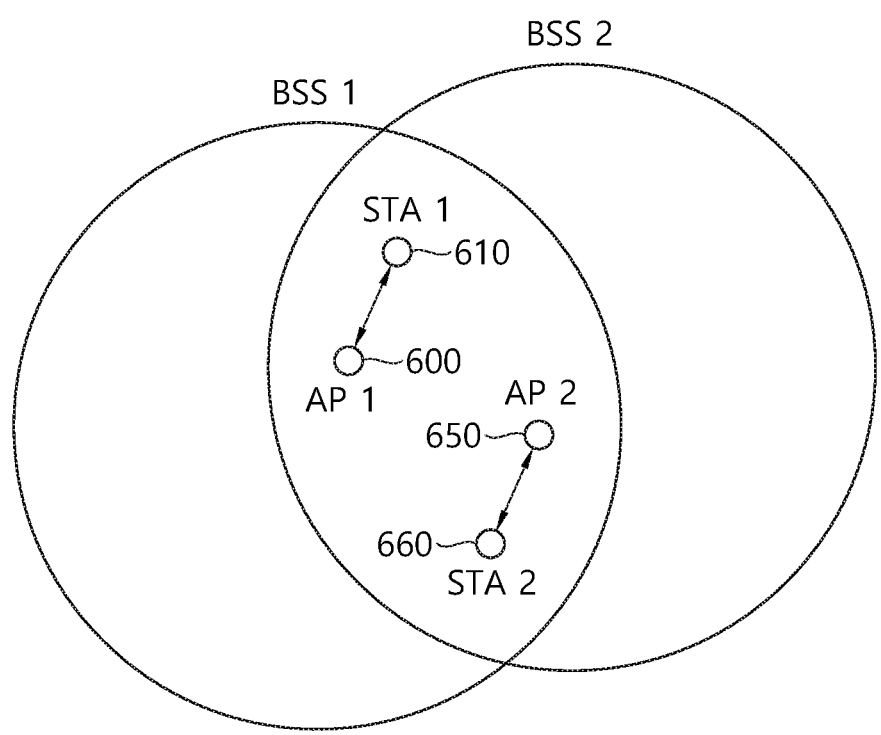
FIG. 6 is a conceptual diagram showing an applicable scenario of another BSS TXOP power save mode according to an embodiment of the present invention.

FIG. 6 is a conceptual diagram showing an applicable scenario of another BSS TXOP power save mode according to an embodiment of the present invention.

FIG. 6 discloses a BSS to which another BSS TXOP power save mode according to an embodiment of the present invention may be applied.

Referring to FIG. 6, a BSS1 may include an AP1 600 and an STA1 610, and a BSS2 may include an AP2 650 and an STA2 660.

The STA1 610 may be associated with the AP1 600, and the STA2 660 may be associated with the AP2 650. If the distance between the STA1 610 and the AP1 600 is close, the STA1 610 and the AP1 600 may receive frames transmitted by the BSS2 (e.g., the STA2 660 and the AP2 650) in reception signal levels of a similar range. The STA may measure the intensity of the received signal in the PHY layer. The STA may determine that the state of a medium is idle if the intensity of the receives signal is smaller than a specific CCA sensitivity level, and may determine that the state of the medium is busy if the intensity of the received signal is greater than or equal to the CCA sensitivity level.

If the STA1 610 and the AP1 600 placed at adjacent distances listen to the frames transmitted by the BSS2 in a similar reception signal level, the STA1 610 and the AP1 600 may identically determine whether the medium is busy or idle based on the frames transmitted by the BSS2. In such a case, the STA1 610 may predict a result of a determination of whether the medium is busy or idle by the AP1 600. The STA1 610 may determine whether it will maintain the awake state or it will switch to the doze state based on the predicted result of the determination of whether the medium is busy or idle by the AP1 600.

That is, an STA operating another BSS TXOP power save mode according to an embodiment of the present invention may receive a frame (or a PPDU) transmitted by another BSS and determine whether it will switch to the doze state or not based on the reception level of the frame (or PPDU) transmitted by another BSS. The frame transmitted by another BSS may be expressed as a term called another BSS frame, and the PPDU on which another BSS frame is carried may be expressed as a term called another BSS PPDU. Hereinafter, another BSS PPDU may be used to include another BSS frame. Furthermore, another BSS PPDU may also be construed as being another BSS frame.

More specifically, the STA1 610 may predict (or determine) that the reception intensity of another BSS PPDU transmitted by the BSS2 of the AP1 600 is the same as or similar to the reception intensity of another BSS PPDU transmitted by the BSS2 of the STA1 610. In such a case, the STA1 610 may predict (or determine) that a result of the determination of a medium by the AP1 600 based on another BSS PPDU transmitted by the BSS2 is the same as a result of the determination of the medium by the STA1 610 based on another BSS PPDU transmitted by the BSS2.

That is, the STA1 610 may predict a determination of the AP1 600 regarding whether the medium is idle or busy based on another BSS PPDU, and may predict an operation of the AP1 600 according to the determination of the medium. If the AP1 600 has determined that the medium is now idle, the AP1 600 may perform channel access and send a downlink frame to the STA1 610. Accordingly, the STA1 610 may maintain the awake state and monitor the downlink frame transmitted by the AP1 600. In contrast, if the AP1 600 determines that the medium is now busy, the AP1 600 may set an NAV for specific duration without sending the downlink frame to the STA1 610. Accordingly, the STA1 may switch from the awake state to the doze state and maintain the doze state during an interval in which the AP1 does not send the downlink frame.

For another BSS TXOP power save mode operation of an STA, each of an AP and the STA needs to receive another BSS PPDU in the same or similar reception level. Accordingly, the AP and/or the STA may determine whether each of the AP and the STA receives another BSS PPDU in the same or similar reception level.

For example, each of the AP and the STA may determine whether the reception levels of another BSS PPDU of the AP and the STA are the same or similar based on the signal intensity of frames that are transmitted and received between the AP and the STA.

For example, the STA may predict whether the AP receives the frame transmitted by another BSS in the reception signal level of a range similar to that of the STA based on the transmission signal intensity reception signal intensity of the frame received from the AP. As a difference between the transmission signal intensity and reception signal intensity of the frame received from the AP is relatively small, the distance between the STA and the AP may be relatively close.

If a difference between the transmission signal intensity and reception signal intensity of the frame received from the AP is a specific threshold value or less, the STA may predict that the AP receives the frame transmitted by another BSS in the reception signal level of a range similar to that of the STA and that the AP performs the same determination as the STA regarding whether the medium is busy or idle.

The STA may periodically determine whether the AP and the STA make the same determination of whether the medium is busy or idle based on the reception intensity of the frame transmitted by the AP. In addition to the STA, the AP may also periodically determine whether the AP and the STA make the same determination of whether the medium is busy or idle based on the reception intensity of the frame transmitted by the STA, and may send a result of the determination to the STA.

An operation of an STA when the STA operates in another BSS power save mode according to an embodiment of the present invention in addition to TIM-based power save mode is described in more detail below.

Figure 7:
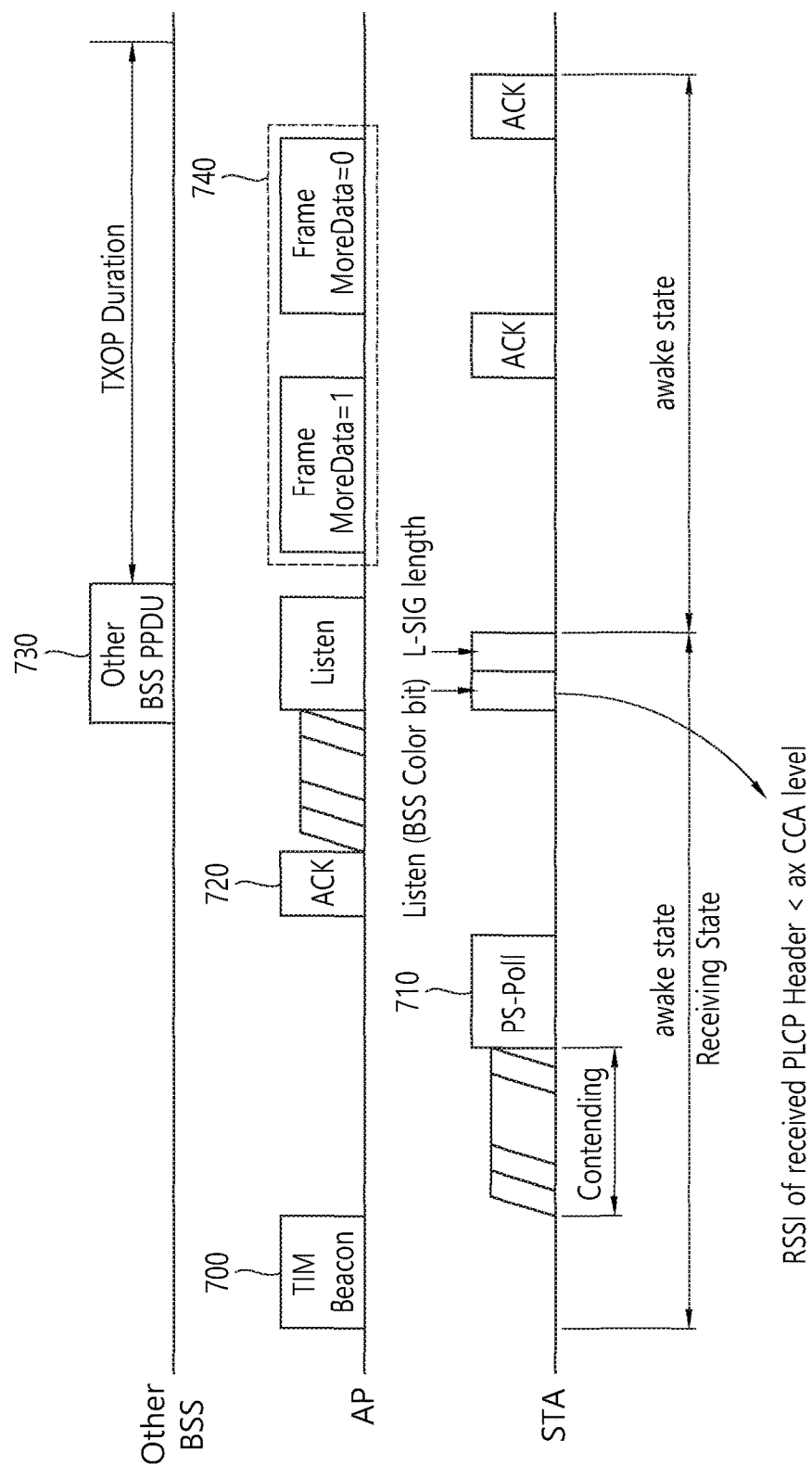
FIG. 7 is a conceptual diagram showing an operation of an STA based on another BSS TXOP power save mode according to an embodiment of the present invention.

FIG. 7 is a conceptual diagram showing an operation of an STA based on another BSS TXOP power save mode according to an embodiment of the present invention.

FIG. 7 discloses an operation of the STA when the STA operating in a TIM-based power save mode and another BSS TXOP power save mode receives indication for downlink data pended (buffered) with respect to the STA based on a TIM included in a beacon frame.

In FIG. 7, it is assumed that an STA is capable of determining an AP's determination of whether a medium is busy or idle based on the reception intensity of received another BSS PPDU. For example, the STA may predict that the STA's determination of whether the medium is idle based on another BSS PPDU and the AP's determination of whether the medium is idle based on another BSS PPDU are the same.

The STA operating in the TIM-based power save mode may switch from the doze state to the awake state in order to receive a beacon frame 700 based on listen duration.

The STA may receive the beacon frame 700, including a TIM indicative of downlink data pending with respect to the STA, from the AP. The STA may receive the beacon frame 700 including the TIM indicative of the downlink data, may perform contention-based channel access, and may send a PS-poll frame 710 to the AP.

The AP that has received the PS-poll frame 710 may send an ACK frame 720 to the STA in response to the PS-poll frame 710. After sending the ACK frame 720, the AP may perform contention-based channel access for sending a downlink frame 740, including the downlink data pending with respect to the STA, to the STA. The AP may perform the channel access by determining whether the medium is busy or idle.

For example, if the medium is not used (i.e., if the medium is idle) for specific duration (e.g., a distributed coordination function (DCF) interframe space (DIFS) or more, the AP may send a MAC protocol data unit (MPDU) whose transmission is impending. In contrast, if the medium is determined to being used by a carrier sensing mechanism, the AP may determine the size of a contention window (CW) according to a random backoff algorithm and perform a backoff procedure. Whether the medium is being used may be determined based on a CCA sensitivity level. For the backoff procedure, the AP may select a random variable selected within the CW, and the backoff time of the AP may be determined when the AP selects the random variable. The AP may perform channel access based on the backoff time.

That is, after the AP sends the ACK frame, the AP may perform the contention-based channel access and the STA may monitor the downlink frame 740 to be transmitted by the AP.

Before the AP sends the downlink frame 740 after the channel access is successful, the AP and the STA may receive another BSS PPDU 730 (or another BSS frame).

In accordance with an embodiment of the present invention, the PPDU may include BSS ID information (e.g., a color bit and a partial basic service set identifier (PBSSID)) indicative of a BSS that has sent the PPDU. In other words, the PHY header (or PLCP header) of the frame may include BSS ID information (a color bit and a PBSSID) indicative of the BSS that has sent the frame.

For example, the color bit is ID information of the BSS of X bits (e.g., X=3) and may be used to identify the BSS. The BSS color bit may be set by the AP, and the AP may send information about the set BSS color bit to the STA. The BSS color bit may be one of integer values between 0~7. A BSS color bit set by the AP may remain intact while the BSS is present.

The PBSSID is ID information of the BSS of Y bits (e.g., Y=9) and may be used to identify the BSS. The PBSSID may be used to identify the BSS based on some of bits that form a BSSID for identifying the BSS. The BSSID is a 48-bit MAC address and may be unique ID information about the BSS. For example, the PBSSID may be the least significant bit (LSB) of 9 bits of the BSSID.

That is, another BSS PPDU 730 may include BSS ID information on which the PPDU has been transmitted. The STA may be aware that the received PPDU is another BSS PPDU 730 based on the BSS ID information included in the received PPDU.

The STA may determine whether the medium is busy or idle by comparing the reception intensity of another BSS PPDU 730 with a CCA sensitivity level (or a CCA level or CCA threshold). The CCA sensitivity level may be criterion intensity for determining whether the medium is busy or idle. For example, if a CCA sensitivity level for a specific bandwidth size is −69 dBm, when a value equal to or greater than −69 dBm is sensed on the medium, the STA may determine that the medium is busy. If a CCA sensitivity level for a specific bandwidth size is −69 dBm, when a value smaller than −69 dBm is sensed on the medium, the STA may determine that the medium is idle.

In accordance with an embodiment of the present invention, in order for an STA operating in another BSS TXOP power save mode to switch to the doze state, a CCA sensitivity level compared with another BSS PPDU reception intensity may be the same as or different from a CCA sensitivity level for determining whether a medium is idle or busy for the channel access of the STA (or an AP).

The CCA sensitivity level compared with the reception intensity of another BSS PPDU in order for an STA operating in another BSS power save mode to determine whether to switch to the doze state may be expressed as a term called another BSS CCA sensitivity level. A CCA sensitivity level for determining whether a medium is idle or busy for the channel access of an STA (or an AP) may be expressed as a term called a channel access CCA sensitivity level.

In accordance with an embodiment of the present invention, another BSS CCA sensitivity level may be set as a value greater than a channel access CCA sensitivity level. If another BSS CCA sensitivity level is set as a relatively great value, a case where an STA determines that a medium is busy may be reduced. That is, an STA operating in another BSS TXOP power save mode may determine that a medium is busy only when it detects a signal of relatively greater intensity compared to a case where channel access is performed. Accordingly, the possibility that an AP performing channel access based on a channel access CCA sensitivity level in order to send a downlink frame and an STA determining whether or not to switch to the doze state based on another BSS CCA sensitivity level make the same determination of whether a medium is busy may be increased. If the possibility that an STA and an AP make the same determination of whether a medium is busy is increased, a case where the STA does not receive the downlink frame transmitted by the AP may be reduced due to the STA's erroneous prediction for a determination of the medium of the AP. Accordingly, in order to increase the possibility that the STA and the AP make the same determination of the medium, another BSS CCA sensitivity level may be set as a value greater than a channel access CCA sensitivity level.

If the reception intensity of another BSS PPDU 730 of the STA is smaller than another BSS CCA sensitivity level, the STA may determine that the medium is idle. As described above, the STA may predict that a determination of the STA regarding whether the medium is idle based on another BSS PPDU and a determination of the AP regarding whether the medium is idle based on another BSS PPDU are the same. That is, the STA may predict (or determine) that the AP has also received another BSS PPDU 730 and has determined that the medium is idle like the STA. In such a case, the STA may predict that the AP will continue to perform contention-based access and send a downlink frame to the STA. Accordingly, the STA may monitor the channel (or the medium) while maintaining the awake state (or a receiving state) without switching to the doze state.

If the AP is successful in channel access, it may send the downlink frame 740, including downlink data pending with respect to the STA, to the STA. The STA may receive the downlink frame 740 transmitted by the AP.

In contrast, if the reception intensity of another BSS PPDU 730 of the STA is greater than or equal to the CCA sensitivity level, the STA may determine that the medium is busy. The STA may predict (or determine) that the AP has also received another BSS PPDU 730 and has determined that the medium is busy like the STA. In such a case, the operation of the STA is disclosed in FIG. 8.

Figure 8:
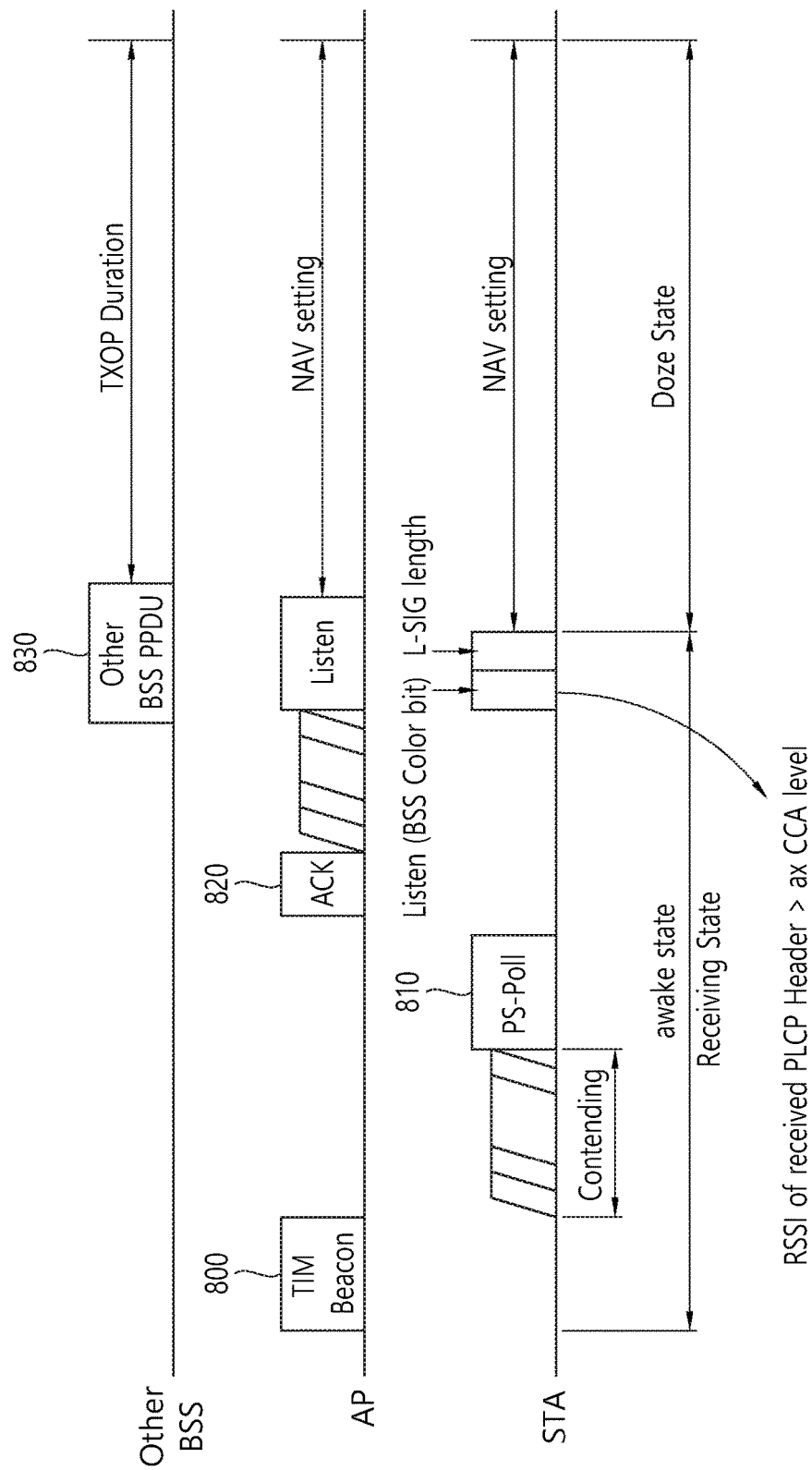
FIG. 8 is a conceptual diagram showing an operation of an STA based on a BSS TXOP power save mode according to an embodiment of the present invention.

FIG. 8 is a conceptual diagram showing an operation of an STA based on a BSS TXOP power save mode according to an embodiment of the present invention.

FIG. 8 discloses an operation of an STA when the STA operating in the TIM-based power save mode and another BSS TXOP power save mode receives indication for pended downlink data based on a TIM included in a beacon frame 800.

In FIG. 8, it is assumed that the STA is capable of determining an AP's determination of whether a medium is busy or idle based on the reception intensity of received another BSS PPDU. For example, the STA may predict that the STA's determination of whether the medium is idle based on another BSS PPDU and the AP's determination of whether the medium is idle based on another BSS PPDU are the same. More particularly, FIG. 8 shows a case where the reception intensity of another BSS PPDU of the STA is greater than or equal to another BSS CCA sensitivity level.

A procedure until the STA sends a PS-poll frame 810 to the AP and the AP sends an ACK frame 820 to the STA in response to the PS-poll frame 810 may be performed like the procedure described in FIG. 7.

Before the AP sends a downlink frame after succeeding in channel access, the AP and the STA may receive another BSS PPDU 830.

The STA may be aware that the received PPDU is another BSS PPDU 830 based on BSS ID information (a color bit or PBSSID) included in the PPDU including the received frame.

The STA may determine whether the medium is busy or idle by comparing the reception intensity of another BSS PPDU 830 with another BSS CCA sensitivity level. If the reception intensity of another BSS PPDU 830 of the STA is greater than or equal to another BSS CCA sensitivity level, the STA may determine that the medium is busy. The STA may predict (or determine) that the AP also has received another BSS PPDU 830 and has determined that the medium is busy like the STA.

In such a case, the STA may determine (or predict) the AP also does not send the downlink frame to the STA for specific duration (e.g., TXOP duration set by another BSS PPDU 830) because the medium is busy. More specifically, the STA may predict (or determine) that the AP has set a network allocation vector (NAV) for the TXOP duration set by another BSS PPDU 830 and will not send the downlink frame. Accordingly, the STA may switch to the doze state for the TXOP duration set by another BSS PPDU 830.

The TXOP duration may be determined based on information that is included in a signal field (e.g., L-SIG) included in the PHY header of another BSS PPDU 830 or a duration field included in the MAC header of another BSS frame carried based on another BSS PPDU 830.

Figure 9:
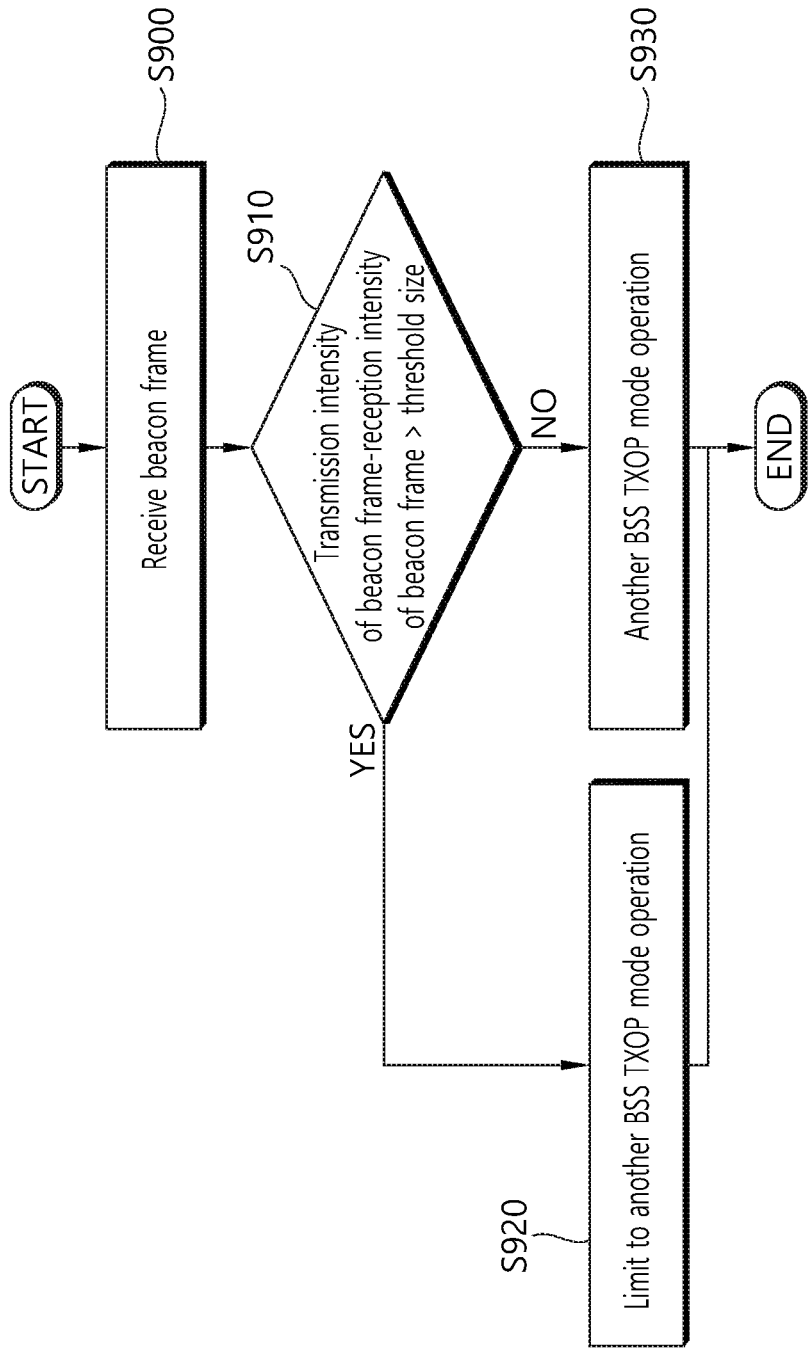
FIG. 9 is a conceptual diagram showing a preliminary procedure for another BSS TXOP power save mode operation of an STA according to an embodiment of the present invention.

FIG. 9 is a conceptual diagram showing a preliminary procedure for another BSS TXOP power save mode operation of an STA according to an embodiment of the present invention.

In FIG. 9, the STA may determine a prediction regarding an AP's determination of whether a medium is idle or not based on another BSS PPDU based on the STA's determination of whether the medium is idle or not based on another BSS PPDU in order to determine another BSS TXOP power save mode operation.

Referring to FIG. 9, the STA may receive a beacon frame from the AP (step S900).

The STA determines whether the STA and the AP make the same determination of whether the medium is busy or idle based on a difference between information about the transmission intensity of the beacon frame included in the beacon frame and the reception intensity of the beacon frame. In other words, the STA may determine whether it can determine the AP's determination of whether the medium is busy or idle based on a difference between information about the transmission intensity of the beacon frame included in the beacon frame and the reception intensity of the beacon frame.

For example, the STA may determine whether a difference between the transmission intensity of the beacon frame included in the beacon frame and the reception intensity of the beacon frame is a threshold size or less (step S910).

If the difference between the transmission intensity of the beacon frame included in the beacon frame and the reception intensity of the beacon frame is the threshold size or less, the STA may determine that the STA and the AP make the same determination of whether the medium is busy or idle. In contrast, if the difference between the transmission intensity of the beacon frame included in the beacon frame and the reception intensity of the beacon frame is greater than the threshold size or less, the STA may determine that the STA and the AP do not make the same determination of whether the medium is busy or idle.

That is, the STA may predict the distance between the STA and the AP based on the difference between the transmission intensity of the beacon frame and the reception intensity of the beacon frame. If the distance between the STA and the AP is close within a specific distance or more, the STA may determine that the STA and the AP make the same determination of whether the medium is busy or idle.

If the STA and the AP make the same determination of whether the medium is busy or idle (or if the STA can be aware of the AP's determination of whether the medium is busy or idle), the STA may perform another BSS TXOP power save mode operation (step S920).

If the STA determines that the STA and the AP which have received another BSS PPDU make the same determination of whether the medium is busy or idle, the STA may operate in another BSS TXOP power save mode as described above with reference to FIGS. 6 to 8. That is, the STA may determine whether or not to switch to the doze state based on the reception intensity of another BSS PPDU.

In contrast, if the STA determines that the STA and the AP do not make the same determination of whether the medium is busy or idle, the STA may not operate in another BSS TXOP power save mode (step S930).

In such a case, the STA may maintain the awake state until it receives the downlink frame, including downlink data pending with respect to the STA, from the AP.

Alternatively, if the STA can be aware of a determination of the AP that has received another BSS PPDU regarding whether the medium is busy or idle, that is, the STA may operate in another BSS TXOP power save mode based on the reception intensity of another BSS PPDU and determine whether or not to switch to the doze state.

An STA operating the TIM-based power save mode may determine whether it will operate in another BSS TXOP power save mode or not whenever it receives a beacon frame. The possibility of a collision between frames can be reduced and efficiency of the use of radio resources can be enhanced because an STA periodically determines whether it will operate in another BSS TXOP power save mode or not.

FIG. 9 discloses an STA's determination of whether it will operate in another BSS TXOP power save mode or not. However, an AP may determine whether an STA will operate in another BSS TXOP power save mode or not in addition to the STA.

Figure 10:
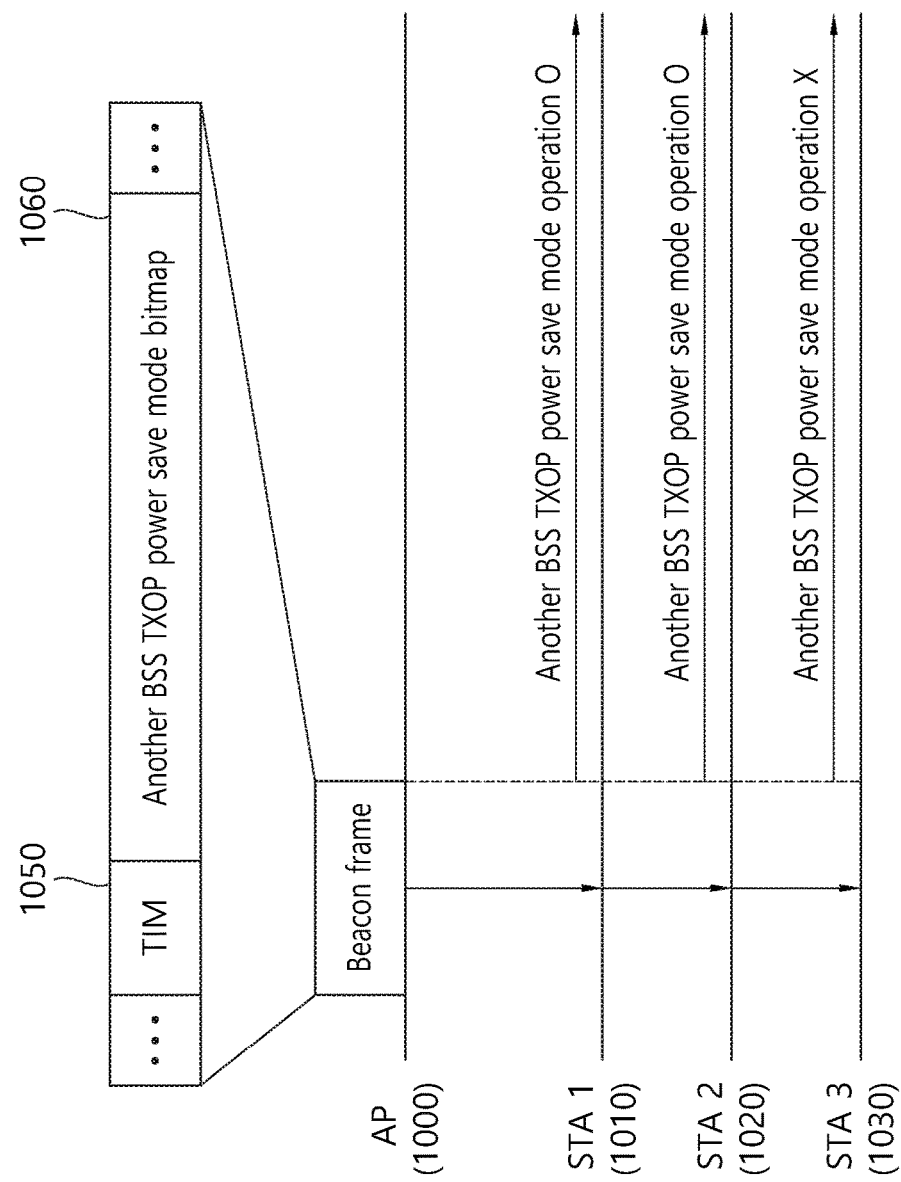
FIG. 10 is a conceptual diagram showing a preliminary procedure for another BSS TXOP power save mode operation of an STA according to an embodiment of the present invention.

FIG. 10 is a conceptual diagram showing a preliminary procedure for another BSS TXOP power save mode operation of an STA according to an embodiment of the present invention.

FIG. 10 discloses a method of determining, by an AP, whether an STA will operate in another BSS TXOP power save mode or not.

Referring to FIG. 10, a beacon frame transmitted by the AP may include information indicating whether the STA operating in the TIM-based power save mode will operate in another BSS TXOP power save mode operation or not.

For example, an STA that belongs to a plurality of STAs for which the pending of downlink data has been indicated and that will operate in another BSS TXOP power save mode may be indicated.

If an AP 1000 has downlink data pending (or buffered) with respect to each of an STA1 1010, STA2 1020, and STA3 1030, the AP may indicate the downlink data pending with respect to each of the STA1 1010, STA2 1020, and STA3 1030 based on a TIM 1050. Each of the STA1 1010, STA2 1020, and STA3 1030 may receive information about the presence of the pending downlink data based on the TIM 1050 of a beacon frame, and may maintain the awake state.

The beacon frame may additionally include information about whether each of the STA1 1010, STA2 1020, and STA3 1030 will operate in another BSS TXOP power save mode or not. For example, the beacon frame may include an additional bitmap indicating whether at least one STA that has received indication for the presence of pending downlink data will perform an operation of BSS TXOP power save mode based on the TIM 1050.

The additional bitmap indicating whether at least one STA that has received indication for the presence of pending downlink data will perform an operation of BSS TXOP power save mode based on the TIM may also be expressed as a term another BSS TXOP power save mode bitmap 1060.

For example, another BSS TXOP power save mode bitmap 1060 may include information about whether each of one or more STAs will operate in another BSS TXOP power save mode in order of the one or more STAs indicated based on the TIM 1050. If the STA1 1010, STA2 1020, and STA3 1030 sequentially receive indication for the presence of pending downlink data based on the TIM 1050, another BSS TXOP power save mode bitmap 1060 may sequentially indicate whether the STA1 1010, STA2 1020, and STA3 1030 will operate in another BSS TXOP power save mode.

It may be assumed that a bit value 1 indicates an STA's execution of another BSS TXOP power save mode operation and a bit value 0 indicates an STA's limit to another BSS TXOP power save mode operation. In such a case, if the power save mode bitmap 1060 is '110', another BSS power save mode operation by the STA1 1010 and the STA2 1020 may be indicated and another BSS power save mode operation by the STA3 1030 may be limited by the AP. That is, only the STA1 1010 and the STA2 1020 can perform another BSS power save operation.

The AP may determine whether an STA will perform another BSS TXOP power save mode operation or not based on priority of pending downlink data. For example, if pending downlink data is data that requires real-time transmission (e.g., AC VO whose access class has high priority), the AP may limit another BSS TXOP power save mode operation by an STA so that the STA maintains the awake state, and may send a downlink frame.

Another BSS TXOP power save mode bitmap is separate information not associated with a TIM, and it may include ID information of an STA and information about whether the STA will operate in another BSS TXOP power save mode and may be transmitted.

Figure 11:
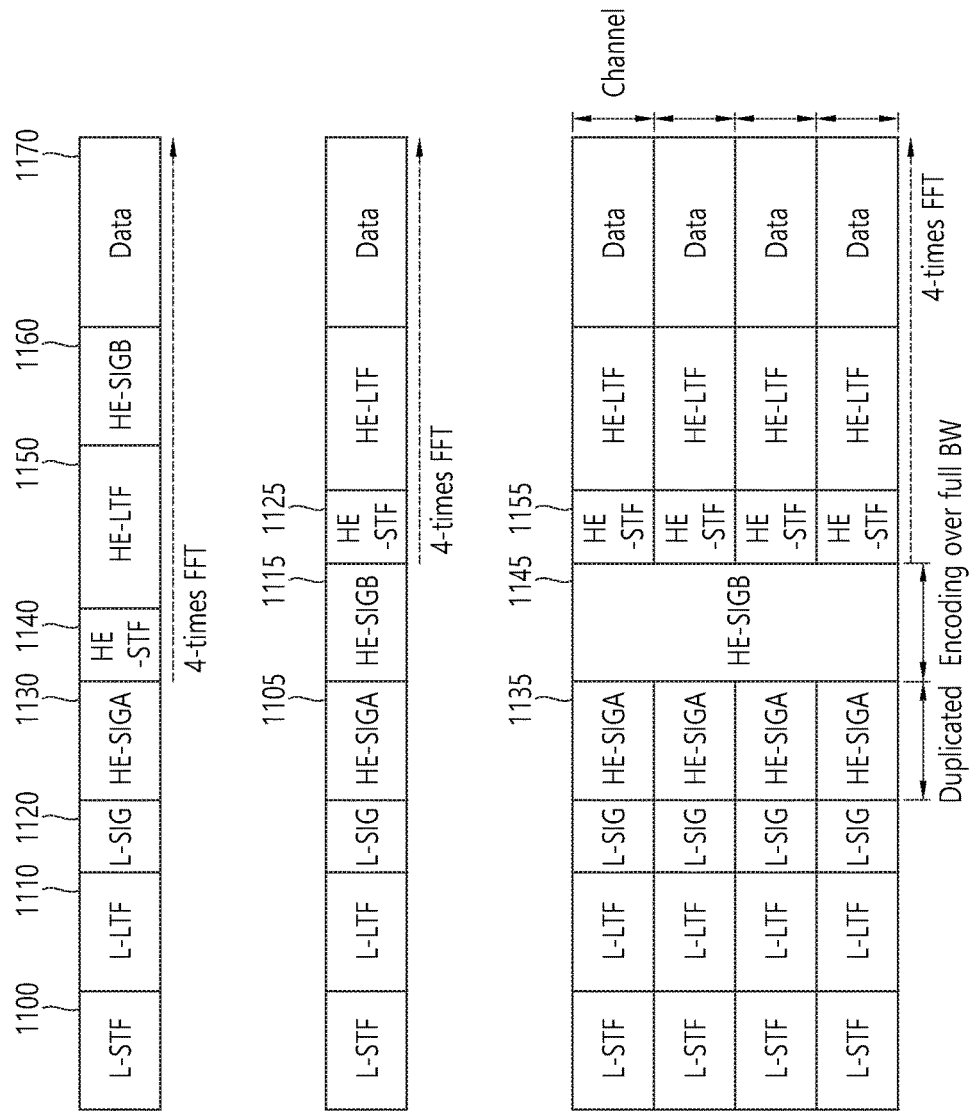
FIG. 11 is a conceptual diagram showing a PPDU format which carries a frame according to an embodiment of the present invention.

FIG. 11 is a conceptual diagram showing a PPDU format which carries a frame according to an embodiment of the present invention.

FIG. 11 discloses a PPDU format according to an embodiment of the present invention. The PPDU may include a PPDU header and a MAC protocol data unit (MPDU) (or a physical layer service data unit (PSDU)). The frame may correspond to an MPDU. The PPDU header of the PPDU format may be used as a meaning including the PHY header of the PPDU and a PHY preamble.

The PPDU format disclosed in FIG. 11 may be used to carry the aforementioned frame (e.g., another BSS frame or the beacon frame).

Referring to the top of FIG. 11, the PPDU header of a downlink PPDU may include a legacy-short training field (L-STF)), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal-B (HE SIG B). A portion from the PHY header to the L-SIG may be divided into a legacy part and a high efficiency part (HE part) after the L-SIG.

The L-STF 1100 may include a short training orthogonal frequency division multiplexing (OFDM) symbol. The L-STF 1100 may be used for frame detection, automatic gain control (AGC), diversity detection, and coarse frequency/time synchronization.

The L-LTF 1110 may include a long training orthogonal frequency division multiplexing (OFDM) symbol. The L-LTF 1110 may be used for fine frequency/time synchronization and channel prediction.

The L-SIG 1120 may be used to transmit control information. The L-SIG 1120 may include information about a data rate and data length.

The HE-SIG A 1130 may include ID information of an STA for indicating a target STA that will receive a downlink PPDU. An STA may determine whether it will receive a PPDU based on ID information of a target STA included in the HE-SIG A 1130. If an STA is indicated based on the HE-SIG A 1130 of a downlink PPDU, the STA may perform additional decoding on the downlink PPDU. Furthermore, the HE-SIG A 1330 may include information about resources (frequency resources (or a subband) (upon transmission based on orthogonal frequency division multiplexing (OFDMA)) or time-space stream resources (upon transmission based on multiple input multiple output (MIMO)) through which downlink data will be received.

Furthermore, the HE-SIG A 1130 may include color bit information for identifying a BSS, bandwidth information, a tail bit, a CRC bit, modulation and coding scheme (MCS) information about the HE-SIG B 1560, symbol number information for the HE-SIG B 1560, and cyclic prefix (CP) (or guard interval (GI)) length information.

The HE-STF 1140 may be used to enhance automatic gain control estimation in an MIMO environment or OFDMA environment.

The HE-LTF 1150 may be used to estimate a channel in an MIMO environment or OFDMA environment.

The HE-SIG B 1160 may include the length of a physical layer service data unit (PSDU), information about a modulation and coding scheme (MCS), and tail bits for each STA.

The sizes of inverse fast Fourier transform (IFFT) applied to the HE-STF 1140 and the fields after the HE-STF 1140 and the size of IFFT applied to the fields prior to the HE-STF 1140 may be different. For example, the sizes of inverse fast Fourier transform (IFFT) applied to the HE-STF 1140 and the fields after the HE-STF 1140 may be four times greater than the size of IFFT applied to the fields prior to the HE-STF 1140. If an STA receives a downlink frame, the STA may decode the HE-SIG A 1130 of the downlink frame, and may determine whether it will decode the fields after the HE-SIG A 1130 based on ID information of a target STA included in the HE-SIG A 1130. In such a case, if the ID information of the target STA included in the HE-SIG A 1130 is indicative of the ID of the STA, the STA may perform decoding based on an FFT size changed from the HE-STF 1140 and the fields after the HE-STF 1140. In contrast, if the ID information of the target STA included in the HE-SIG A 1130 does not indicate the ID of the STA, the STA may stop decoding and may set a network allocation vector (NAV). The cyclic prefix (CP) of the HE-STF 1140 may have a greater size than the CP of another field. For such CP duration, the STA may change the FFT size and perform decoding on the downlink PPDU.

The sequence of the fields forming the format of the PPDU disclosed at the top of FIG. 11 may be changed. For example, as disclosed in the middle of FIG. 11, the HE-SIG B 1115 of an HE part may be placed right after an HE-SIG A 1105. An STA may decode the HE-SIG A 1105 and the HE-SIG B 1115, may receive required control information, and may set an NAV. Likewise, the sizes of IFFT applied to an HE-STF 1125 and fields after the HE-STF 1125 may be different from the size of IFFT applied to the fields prior to the HE-STF 1125.

An STA may receive the HE-SIG A 1105 and the HE-SIG B 1115. If the reception of the downlink PPDU is indicated by the ID of the target STA of the HE-SIG A 1105, the STA may change an FFT size from the HE-STF 1125 and perform decoding on the downlink PPDU. In contrast, the STA receives the HE-SIG A 1105. If the reception of the downlink PPDU is not indicated based on the HE-SIG A 1105, the STA may set a network allocation vector (NAV).

Referring to the bottom of FIG. 11, a downlink PPDU format for downlink (DL) multi-user (MU) transmission is disclosed. The downlink PPDU may be transmitted to an STA through a different downlink transmission resource (frequency resource or spatial stream) based on OFDMA. That is, downlink data may be transmitted to a plurality of STAs through a plurality of subbands based on the downlink PPDU format for DL MU transmission.

Fields of a downlink PPDU prior to an HE-SIG B 1145 may be transmitted in different downlink transmission resources in a duplicated form. The HE-SIG B 1145 may be transmitted on all of the transmission resources in an encoded form. Fields after the HE-SIG B 1145 may include individual information for each of a plurality of STAs that receive the downlink PPDU.

If the fields included in the downlink PPDU are transmitted through respective downlink transmission resources, CRC for each of the fields may be included in the downlink PPDU. In contrast, if a specific field included in the downlink PPDU is encoded and transmitted on all of the downlink transmission resources, CRC for each of the fields may not be included in the downlink PPDU. Accordingly, overhead for CRC can be reduced. That is, the downlink PPDU format for DL MU according to an embodiment of the present invention can reduce overhead for the CRC of a downlink frame because it uses the HE-SIG B 1145 of a form encoded on all of transmission resources.

Likewise, in the downlink PPDU format for DL MU transmission, an HE-STF 1155 and fields after the HE-STF 1155 may be encoded based on an IFFT size different from that of the fields prior to the HE-STF 1155. Accordingly, an STA receives the HE-SIG A 1135 and the HE-SIG B 1145. If the reception of the downlink PPDU is indicated based on the HE-SIG A 1135, the STA may change an FFT size from the HE-STF 1155 and perform decoding on the downlink PPDU.

Figure 12:
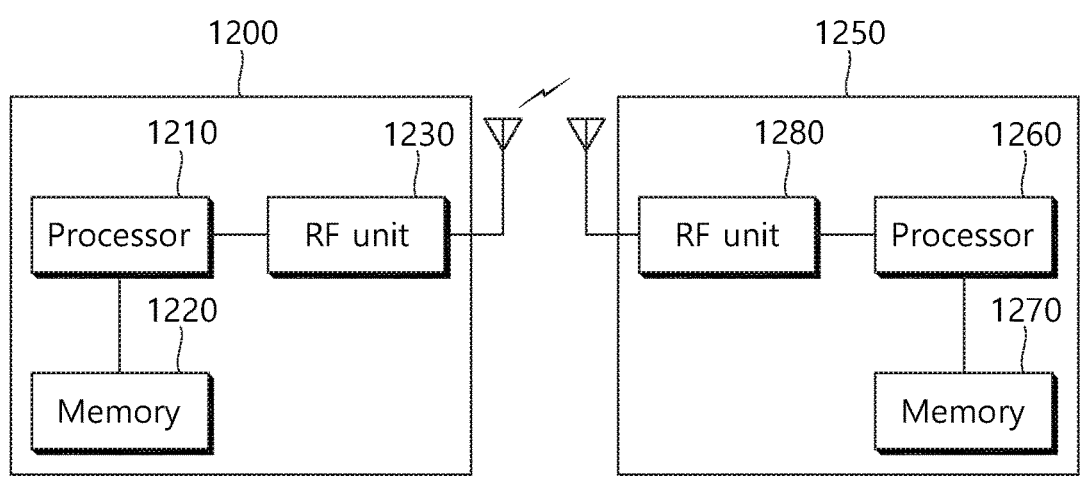
FIG. 12 is a block diagram showing a wireless device to which an embodiment of the present invention may be applied.

FIG. 12 is a block diagram showing a wireless device to which an embodiment of the present invention may be applied.

Referring to FIG. 12, the wireless device 1200 is an STA capable of implementing the aforementioned embodiments and may be an AP 1200 or a non-AP station (or STA) 1250.

The AP 1200 includes a processor 1210, memory 1220, and a radio frequency (RF) unit 1230.

The RF unit 1230 is connected to the processor 1210 and may send/receive a radio signal.

The processor 1210 may implement the functions, processes and/or methods proposed by the present invention. For example, the processor 1210 may be implemented to perform the operations of the wireless device according to the embodiments of the present invention. The processor may perform the operations of the wireless device disclosed in the embodiments of FIGS. 1 to 11.

For example, the processor 1210 may be implemented to configure the operation of an STA in another BSS TXOP power save mode. The processor 1210 may generate a frame including information for configuring the operation of an STA in another BSS TXOP power save mode.

The STA 1250 includes a processor 1260, memory 1270, and an RF unit 1280.

The RF unit 1280 is connected to the processor 1260 and may send/receive a radio signal.

The processor 1260 may implement the functions, processes and/or methods proposed by the present invention. For example, the processor 1260 may be implemented to perform the operations of the wireless device according to the embodiments of the present invention. The processor may perform the operations of the wireless device disclosed in the embodiments of FIGS. 1 to 11.

For example, the processor 1260 may be implemented to switch to the awake state based on listen duration, to receive a beacon frame, including traffic indication map (TIM) information indicative of downlink data buffered with respect to the STA, from an access point (an AP), and to send a power saving (PS)-poll frame for the reception of the downlink frame, including the buffered downlink data, to the AP.

Furthermore, the processor 1260 may be implemented to receive an acknowledgement (ACK) frame from the AP as a response to the PS-poll frame, to receive another basic service set physical layer protocol data unit (BSS PPDU) before receiving the downlink frame from the AP after receiving the ACK frame, and to determine whether it will switch from the awake state to the doze state based on the reception intensity of another BSS PPDU. Another BSS PPDU may include a frame transmitted by another BSS other than a BSS including the STA.

The processor 1210, 1260 may include application-specific integrated circuits (ASICs), other chip sets, logic circuits, data processors and/or converters for mutually converting a baseband signal and a radio signal. The memory 1220, 1270 may include read-only memory (ROM), random access memory (RAM), flash memory, memory cards, storage media and/or other storage devices. The RF unit 1230, 1280 may include one or more antennas for transmitting and/or receiving a radio signal.

When an embodiment is implemented in software, the aforementioned scheme may be implemented as a module (a process, a function, etc.) performing the aforementioned function. The module may be stored in the memory 1220, 1270 and executed by the processor 1210, 1260. The memory 1220, 1270 may be placed inside or outside the processor 1210, 1260 and connected to the processor 1210, 1260 by various well-known means.

What is claimed is:

1. An operating method based on a power save mode in a WLAN, the method comprising:
   switching, by a station (STA), to an awake state based on listen duration and receiving a beacon frame from an access point (AP), the beacon frame comprising traffic indication map (TIM) information indicative of downlink data buffered with respect to the STA;
   sending, by the STA, a power saving (PS)-poll frame for a reception of a downlink frame comprising the buffered downlink data to the AP;
   receiving, by the STA, an acknowledgement (ACK) frame from the AP as a response to the PS-poll frame;
   receiving, by the STA, another basic service set physical layer protocol data unit (BSS PPDU) before receiving the downlink frame from the AP after receiving the ACK frame; and
   determining, by the STA, whether or not to switch from the awake state to a doze state based on reception intensity of the another BSS PPDU,
   wherein the another BSS PPDU comprises a frame transmitted by another BSS other than a BSS comprising the STA, and
   wherein determining, by the STA, whether or not to switch from the awake state to the doze state based on the reception intensity of the another BSS PPDU comprises steps of:
      determining, by the STA, to maintain the awake state if the reception intensity of the another BSS PPDU is smaller than a clear channel assessment (CCA) sensitivity level; and
      determining, by the STA, to switch from the awake state to the doze state if the reception intensity of the another BSS PPDU is equal to or greater than the CCA sensitivity level.

2. The operating method of claim 1, wherein the doze state is maintained for transmission opportunity (TXOP) duration set by the another BSS PPDU.

3. The operating method of claim 1, wherein the CCA sensitivity level is greater than a channel access CCA sensitivity level for detecting whether a medium is busy when the STA performs channel access.

4. The operating method of claim 1, wherein the STA predicts a determination of the AP based on the another BSS PPDU regarding whether a medium is busy based on the reception intensity of the another BSS PPDU.

5. A station (STA) operating based on a power save mode in a WLAN, the STA comprising:
   a radio frequency (RF) unit implemented to transmit or receive a radio signal; and
   a processor operatively connected to the RF unit,
   wherein the processor is implemented to switch to an awake state based on listen duration and receive a beacon frame comprising traffic indication map (TIM) information indicative of downlink data buffered with respect to the STA from an access point (AP), send a power saving (PS)-poll frame for a reception of a downlink frame comprising the buffered downlink data to the AP, receive an acknowledgement (ACK) frame from the AP as a response to the PS-poll frame, receive another basic service set physical layer protocol data unit (BSS PPDU) before receiving the downlink frame from the AP after receiving the ACK frame, and determine to switch from the awake state to a doze state based on the reception intensity of the another BSS PPDU, and
   the another BSS PPDU comprises a frame transmitted by another BSS other than a BSS including the STA, and
   wherein the processor determines to maintain the awake state if the reception intensity of the another BSS PPDU is smaller than a clear channel assessment (CCA) sensitivity level and determines to switch from the awake state to the doze state if the reception intensity of the another BSS PPDU is equal to or greater than the CCA sensitivity level.

6. The STA of claim 5, wherein the doze state is maintained for transmission opportunity (TXOP) duration set by the another BSS PPDU.

7. The STA of claim 5, wherein the CCA sensitivity level is greater than a channel access CCA sensitivity level for detecting whether a medium is busy when the STA performs channel access.

8. The STA of claim 5, wherein the STA predicts a determination of the AP based on the another BSS PPDU regarding whether a medium is busy based on the reception intensity of the another BSS PPDU.

* * * * *